United States Patent [19]

Falempin

[11] Patent Number: 5,004,187
[45] Date of Patent: Apr. 2, 1991

[54] SYMMETRICAL, TWO DIMENSIONAL, SUPERSONIC AND HYPERSONIC AIR INTAKE FOR THE COMBUSTION AIR OF AN AIRCRAFT ENGINE

[75] Inventor: Francois Falempin, Saint Michel sur Orge, France

[73] Assignee: Office National D'Etudes et de Recherches Aerospatiales, France

[21] Appl. No.: 386,110

[22] Filed: Jul. 28, 1989

[30] Foreign Application Priority Data

Aug. 4, 1988 [FR] France ............... 88 10558

[51] Int. Cl.⁵ .............................................. B64D 33/02
[52] U.S. Cl. .................................................... 244/53 B
[58] Field of Search ........................................ 244/53 B

[56] References Cited

U.S. PATENT DOCUMENTS

| | | | |
|---|---|---|---|
| 3,066,892 | 12/1962 | Smith et al. | 244/53 B |
| 3,104,522 | 9/1963 | Pennington et al. | 244/53 B |
| 3,941,336 | 3/1976 | Nangia | 244/53 B |
| 4,025,008 | 5/1977 | Peikert | 244/53 B |
| 4,372,505 | 2/1983 | Syberg | 244/53 B |
| 4,381,017 | 4/1983 | Bissinger | 244/53 B X |
| 4,463,772 | 8/1984 | Ball | 244/53 B X |
| 4,620,679 | 11/1986 | Karanian | 244/53 B |
| 4,641,678 | 2/1987 | Haas et al. | 244/53 B X |

FOREIGN PATENT DOCUMENTS

| | | | |
|---|---|---|---|
| 354103 | 2/1990 | European Pat. Off. | 244/53 B |
| 356280 | 2/1990 | European Pat. Off. | 244/53 B |
| 3811614 | 5/1989 | Fed. Rep. of Germany | 244/53 B |
| 1234483 | 10/1960 | France | 244/53 B |
| 653647 | 5/1963 | Italy | 244/53 B |
| 254498 | 10/1989 | Japan | 244/53 B |
| 860497 | 2/1961 | United Kingdom | 244/53 B |
| 870182 | 6/1961 | United Kingdom | 244/53 B |
| 907288 | 10/1962 | United Kingdom | 244/53 B |

Primary Examiner—Margaret A. Focarino
Assistant Examiner—James M. Kannofsky
Attorney, Agent, or Firm—Larson and Taylor

[57] ABSTRACT

Two dimensional, supersonic and hypersonic air intake for the combustion air of an aircraft engine, comprising two front flaps (3) forming a visor, disposed symmetrically on each side of a longitudinal plane (P), each front flap (3) being movable about a pivoting axis (4) situated in the vicinity of the wall of the air intake which extends the front flap considered. The pivoting axis (4) of each front flap (3) is situated in the vicinity of a first boundary layer trap (5) disposed in the wall of the air intake which extends said front flap (3).

3 Claims, 6 Drawing Sheets

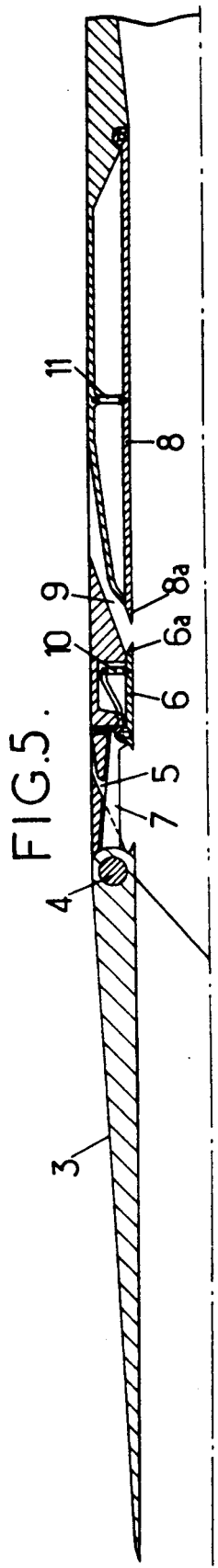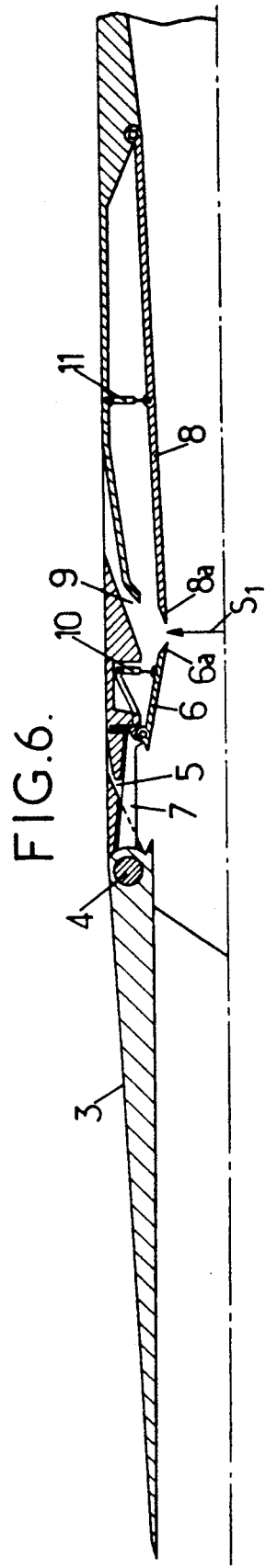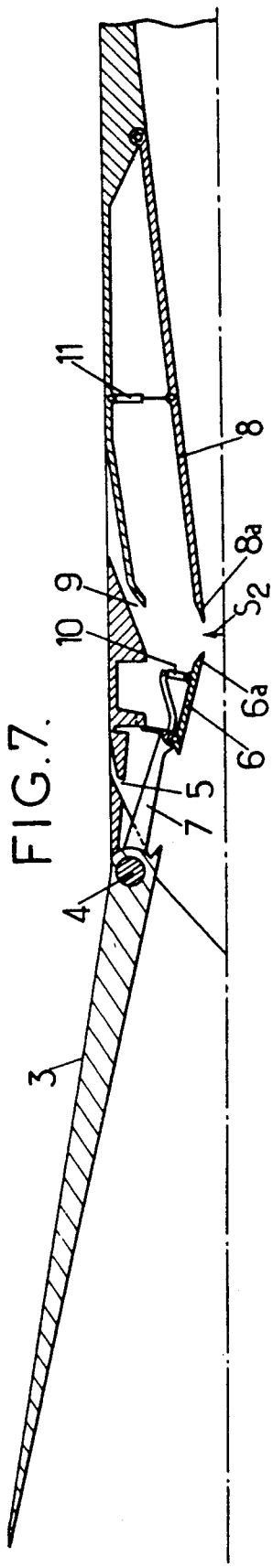

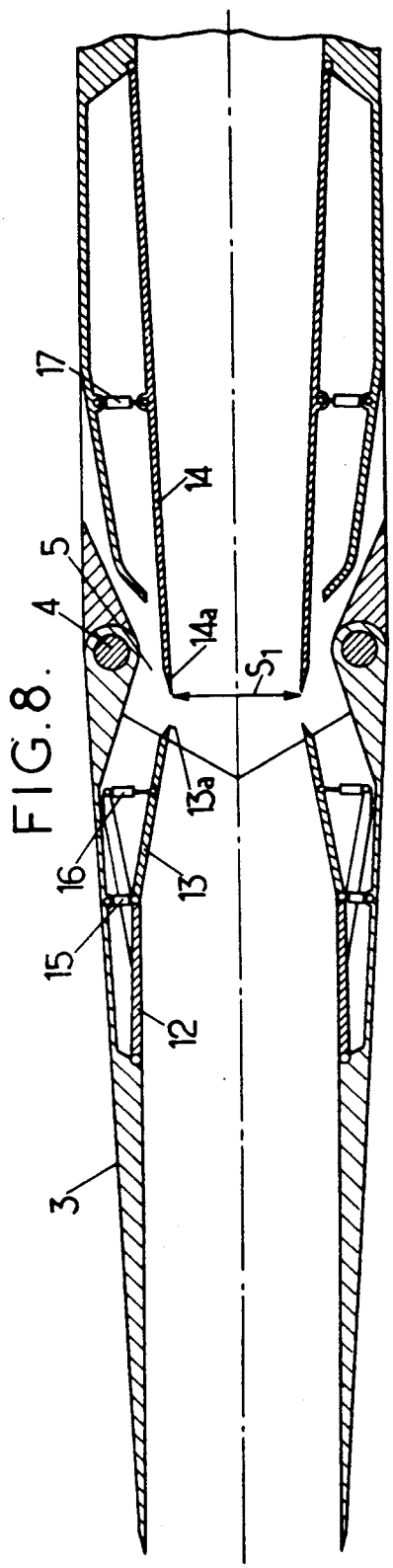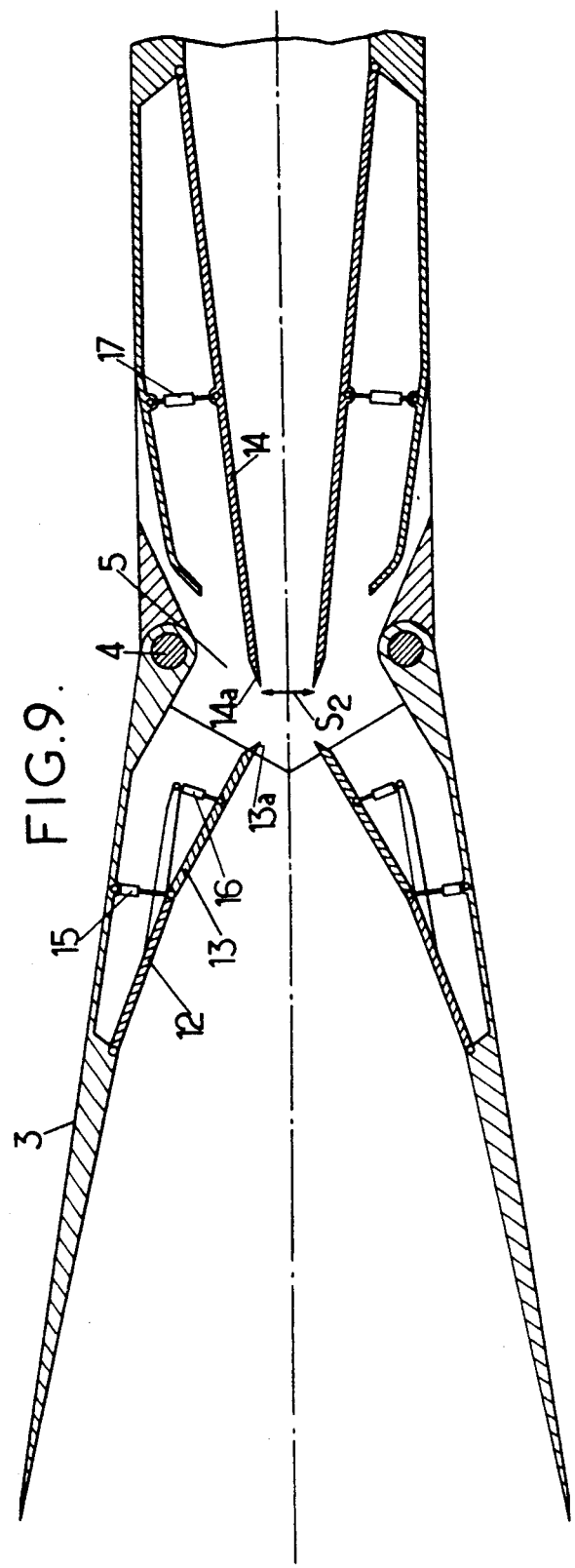

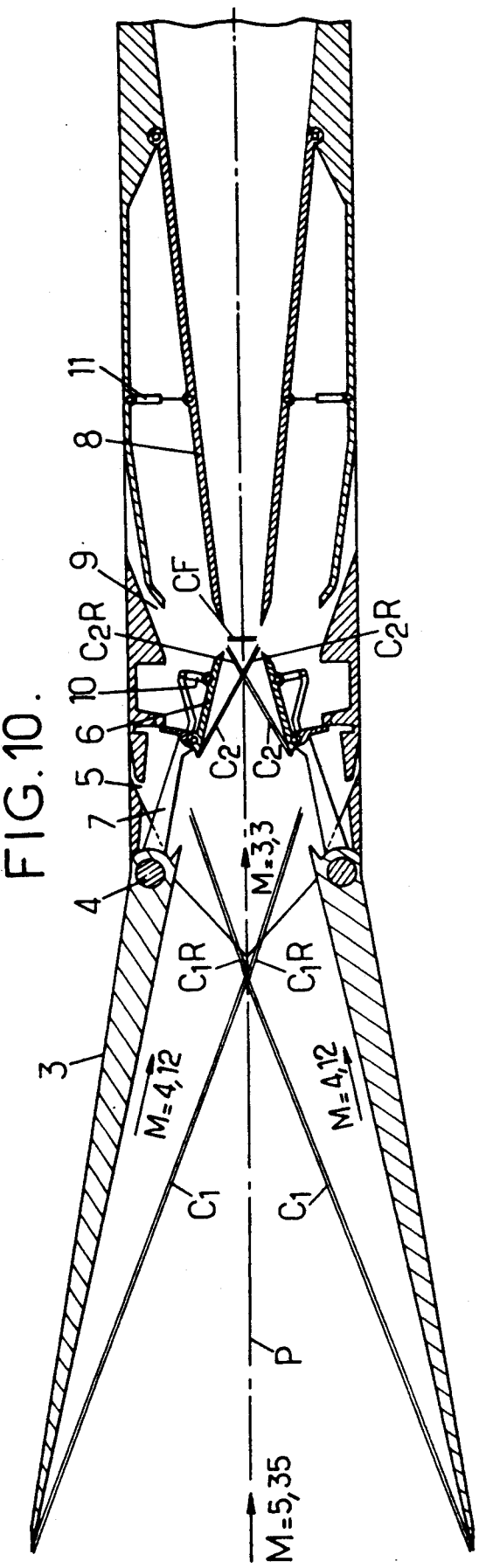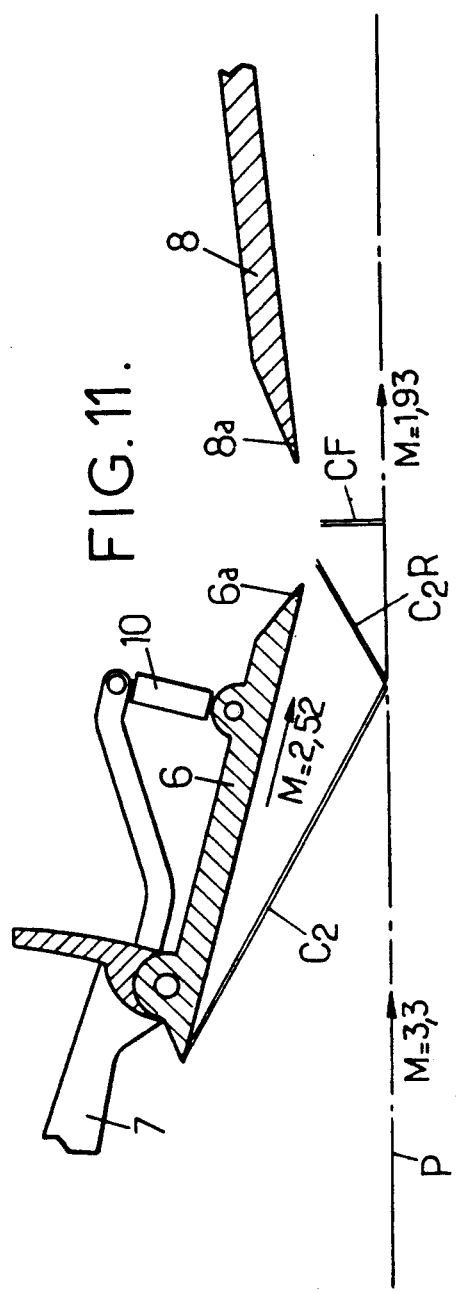

SYMMETRICAL, TWO DIMENSIONAL, SUPERSONIC AND HYPERSONIC AIR INTAKE FOR THE COMBUSTION AIR OF AN AIRCRAFT ENGINE

The invention relates to a supersonic and hypersonic air intake for the combustion air of an aircraft engine, this air intake being of the two dimensional symmetrical type, i.e. the symmetrical character of this air intake results from the fact that it has two front flaps forming a visor disposed symmetrically on each side of a longitudinal plane.

An air intake must perform well (in efficiency and flowrate) throughout a wide flight range so as to be able to be applied to numerous aircraft: thus, the air intake must be matched to the Mach number and to the flight altitude, two parameters which are directly related.

In fact, low altitude flights can only be undertaken at moderate Mach numbers (up to 3), for heat resistant reasons, whereas at high altitudes (20,000 to 30,000 meters), the Mach number must be appreciably greater so that, considering the rarefaction of the air, a sufficient dynamic pressure can be maintained for providing the lift of the aircraft.

For this reason, in order to obtain a high thrust over the whole trajectory of the aircraft, not only at low but also at high altitude, it is necessary to supply the engine with a very variable flowrate of combustion air with a sufficient rate of generating pressure recovery for all the Mach numbers.

The air intake must then have an intake section which may increase in large proportions with the increase of the Mach number, and more particularly with a rapid increase of the Mach number (rapid re-acceleration of the aircraft after maneuvering): this increase of the Mach number must extend up to about Mach 6 or 7. Air intakes have therefore been proposed with variable geometry.

The prior art related to variable geometry air intakes is formed by the solutions known for constructing aircraft travelling at speeds less than Mach 4 to 4.5 because too high a drag occurs beyond said limit speeds. It corresponds to constructions provided on the CONCORDE aircraft (mobile compression and diffusion ramps defining therebetween an internal boundary layer trap), on the aircraft AVIONS MARCEL DASSAULT/BREGUET AVIATION "MIRAGE" (mobile body—called "souris" (shock cone)—along the wall of the fairing), on the aircraft McDONNELL DOUGLAS F15 (front element comprising a flap fast with the sidewalls forming an assembly pivoting about an axis in the vicinity of the leading edge of the fairing).

The U.S. Pat. No. 2,877,965 describes an air intake comprising single flaps and which does not teach the means to use for carrying out flights at Mach numbers of 6 or 7. The flight range of the air intake mentioned in this U.S. Pat. No. 2,877,965 covers from subsonic to the moderate supersonic. In the single flap system described in this U.S. Pat. No. 2,877,965, the flight range of the high supersonic (Mach 6 or 7) is prohibited because of boundary layer separation phenomena.

The object of the present invention consists of an air intake with variable geometry capable of providing very high flowrates per unit of volume at high Mach numbers which may reach Mach 6 or 7.

According to the invention, the two dimensional, supersonic and hypersonic air intake for the combustion air of an aircraft engine comprises two front flaps forming a visor, disposed symmetrically on each side of a longitudinal plane, each front flap being movable about a pivoting axis situated in the vicinity of the wall of the air intake which extends the front flap considered, and it is characterized by the fact that the pivoting axis of each front flap is situated in the vicinity of a first boundary layer trap disposed in the wall of the intake which extends said front flap.

Because of the boundary layer trap thus provided, it is possible to avoid the boundary layer separation phenomena.

The shocks occurring in the compression ramp, formed by the internal wall of each mobile flap, converge towards the plane of symmetry of the air intake. The shocks reflected from the plane of symmetry intercept the walls at the level of the internal boundary layer traps. There is no compression wave—boundary layer interaction in the absence of any material wall between the two mobile flaps.

Thus, a good level of efficiency is obtained while obtaining an appreciable drag gain, especially when the air intake delivers a flowrate per unit of volume corresponding to Mach numbers of the order of 6 or 7 for which the opening is maximum.

It is advantageous to have recourse to the embodiment in which the front flap comprises a mobile rear flap connected to said front flap by one or more arms so that this mobile rear flap is situated downstream of the first boundary layer trap, the rear end of this mobile rear flap cooperating with the front end of a mobile internal wall element for defining a second boundary layer trap whose position in the passage of the air intake may vary as a function of the Mach number.

Recourse may also be had to another embodiment in which the rear part of the internal wall of the front flap is formed of two articulated wall elements, the first on the front flap and the second on the first, the rear end of this second wall element cooperating with the front end of a mobile internal wall element for defining said first boundary layer trap, whose position in the passage of the air intake may therefore vary as a function of the Mach number.

Apart from the arrangements already described, the invention comprises certain other arrangements which are preferably used at the same time and which will be more explicitly discussed hereafter.

The invention may in any case be well understood from the complement of description which follows, as well as the accompanying drawings, which complement and drawings are relative to preferred embodiments of the invention and of course comprise no limitative character.

FIGS. 1 and 2 of these drawings are two front diagrams of an aircraft equipped with air intake in accordance with the invention;

FIGS. 5, 6 and 7 shows, in three different positions, an air intake formed in accordance with a second embodiment of the pivoting axis;

FIGS. 8 and 9 show, in two different positions, an air intake formed in accordance with a third embodiment of the invention;

FIGS. 10 and 11 show the operation under critical operating conditions of an air intake according to the invention.

Figure 1:
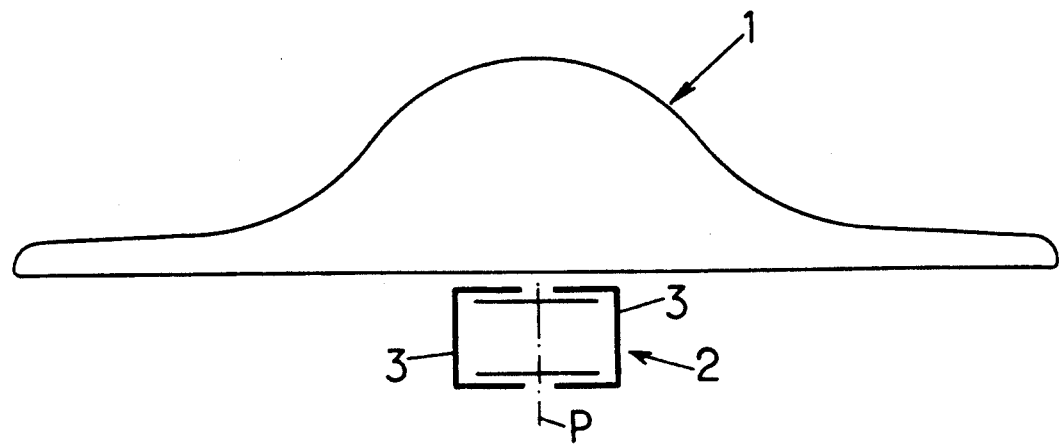
Figure 2:
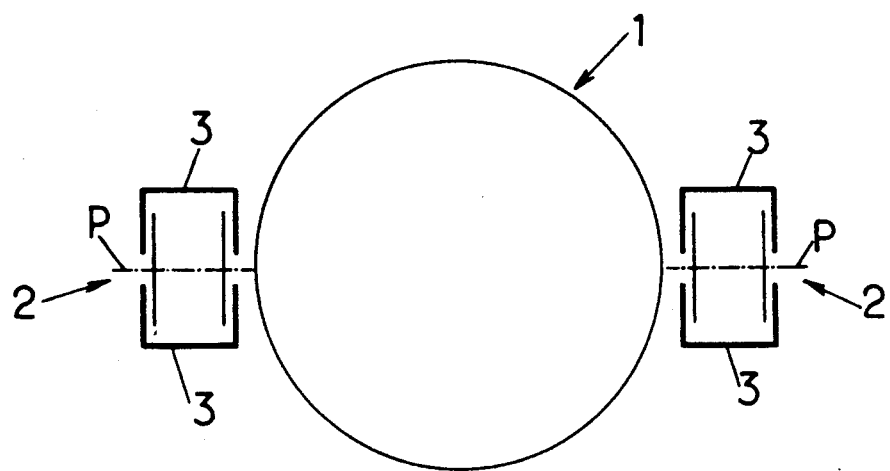

In FIGS. 1 and 2, there has been shown schematically at 1 the silhouette of an aircraft seen from the front and comprising:

an air intake 2 situated under the fuselage (FIG. 1), two air intakes 2 situated laterally on each side of the fuselage (FIG. 2).

Each air intake 2 provides an engine (not shown) of aircraft 1 with combustion air.

The air intake of two dimensional and symmetrical type comprises two front flaps 3 forming a visor and disposed symmetrically on each side of a longitudinal plane of symmetry P of the air intake.

As shown in FIGS. 3 to 9, which are longitudinal sections of an air intake in accordance with the invention, each front flap 3 is movable about a pivoting axis 4 situated in the vicinity of the air intake wall which extends the front wall 3 considered.

As shown in FIGS. 3 to 9, the arrangement of the pivoting axis 4 of the front flap 3 is such that said pivoting axis is situated in the vicinity of a first boundary layer trap 5 disposed in the air intake wall which extends said front flap.

Figure 3:
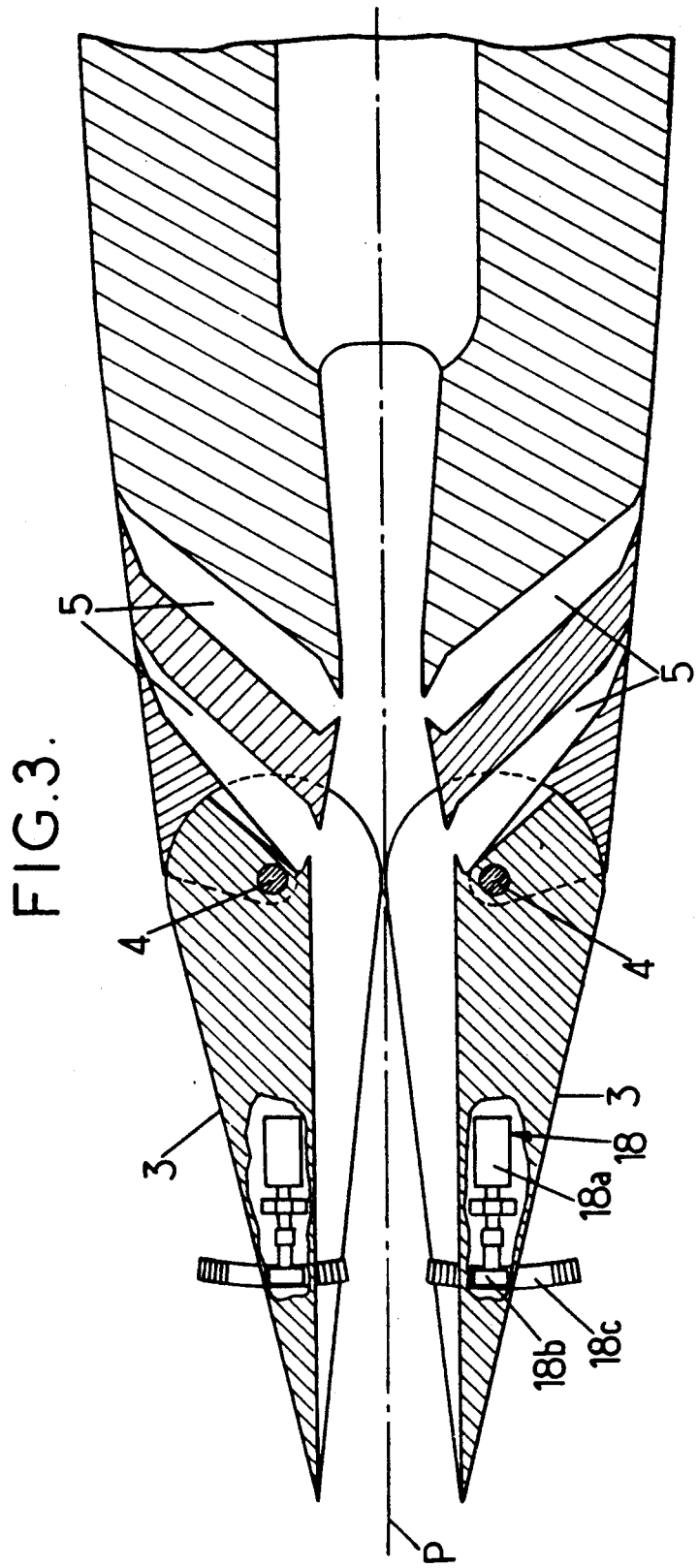
FIGS. 3 and 4 show, in two different positions, an air intake formed according to a first embodiment of the invention.
Figure 4:
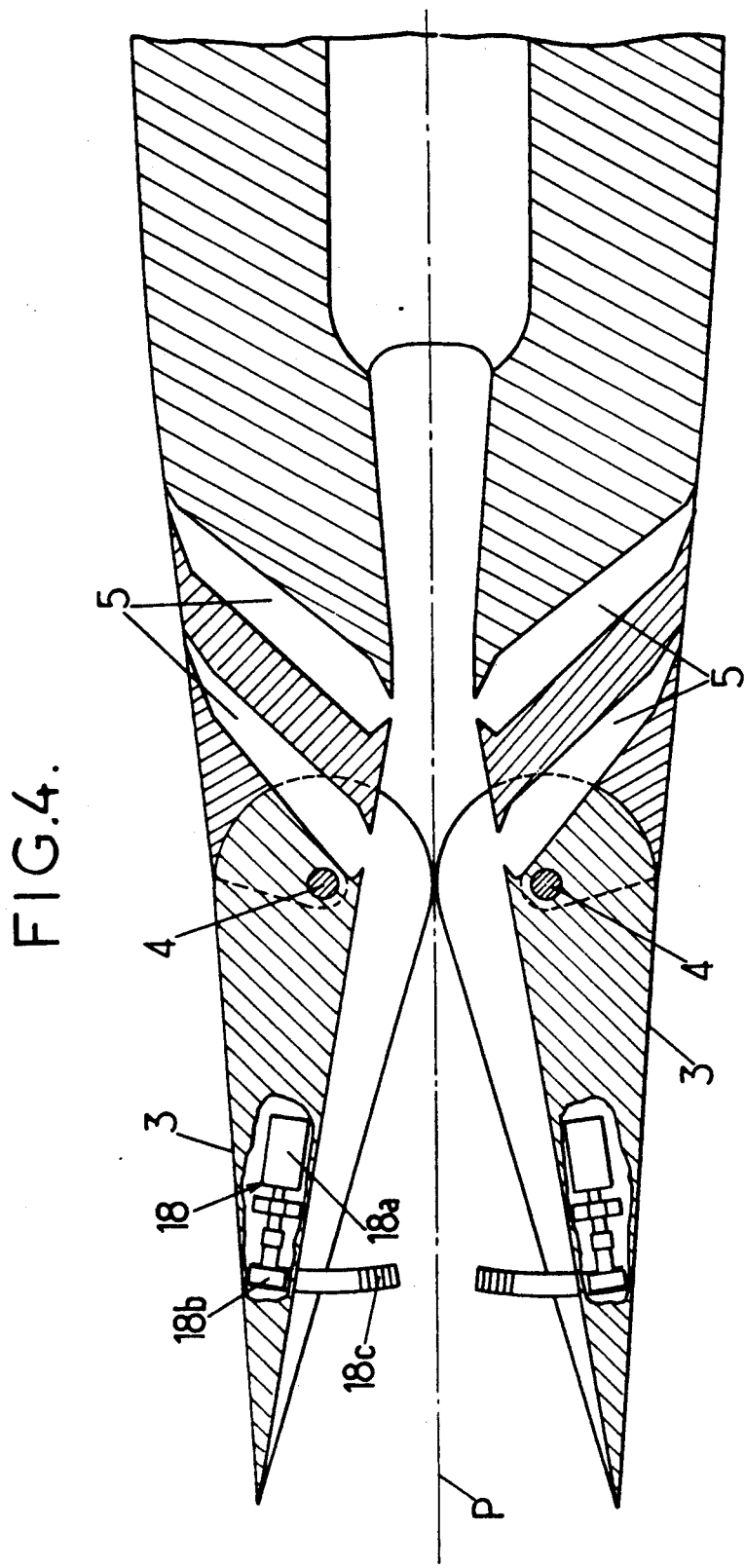

In the constructional arrangement illustrated in FIGS. 3 and 4, this first boundary layer trap 5 is double, i.e. it comprises two boundary layer traps disposed one behind the other.

In FIG. 3, a configuration of the air intake has been shown for a Mach number equal to 2.1 and in FIG. 4 has been shown the configuration of the air intake for a Mach number equal to 4.5.

It is possible to obtain a configuration of the air intake for which the two front flaps are completely closed, this configuration being advantageous before operation of the engine of the aircraft, in the case of a malfunction during flight on a multi-engine aircraft or during a non propelled atmospheric re-entry phase.

It is also possible to have a configuration in which the two front flaps are open with different angles for example for correcting skidding.

Recourse may also be had to the embodiment illustrated in FIGS. 5, 6 and 7 and in which the front flap 3 comprises a mobile rear flap 6 connected to the front flap 3 by one or more arms 7, so that this mobile rear flap 6 is situated downstream of the first boundary layer trap 5, the rear end 6a of this mobile rear flap 6 cooperating with the front end 8a of a mobile internal wall element 8 for defining a second boundary layer trap 9 whose position in the passage of the air intake may vary as a function of the Mach number.

The position of this mobile rear flap 6 is controlled by control means 10.

The position of the mobile internal wall element 8 is controlled by control means 11.

In FIG. 5 has been shown the configuration of the air intake for a Mach number less than 1:

the two front flaps 3 are in a posit±on in which the front section of the air intake is minimum, on each side, the mobile rear flap 6 is in a retracted position as well as the mobile internal wall element 8 so as to define a wall, extending the front flap 3, which defines a passage with practically constant section.

In FIG. 6 has been shown the configuration of the air intake for a Mach number of about 2:

the two front flaps 3 are in a position in which the front section of the air intake is still minimum, on each side, the mobile rear flap 6 is in an extended position, and the mobile internal wall element 8 is in an intermediate position so that these two walls form a convergent-divergent cone, defining a minimum section $S_1$ at the level of which is to be found the second boundary layer trap 9.

In FIG. 7, the configuration has been shown of the air intake for a Mach number greater than 5:

the two front flaps 3 are in a position in which the front section of the air intake is maximum, on each side, the mobile rear flap 6 is in a retracted position and is situated in the extension of the front flap 3, and the mobile internal wall element 8 is in an extended position so that these two walls form a convergent-divergent cone defining a minimum section $S_2$ less than the minimum section $S_1$ of the preceding configuration for Mach number 2 and at the level of which is to be found the opening of the second boundary layer trap 9.

Recourse may also be had to the embodiment illustrated in FIGS. 8 and 9, in which the rear portion of the internal wall of the front flap 3 is formed of two articulated wall elements 12 and 13, namely the first wall element 12 articulated to the front flap 3, and the second wall element 13 articulated to the first wall element 12.

The rear end 13a of this second wall element cooperates with the front end 14a of a mobile internal wall element 14 for defining the first boundary layer trap 5.

The position of the first articulated wall element 12 is controlled by control means 15.

The position of the second articulated wall element 13 is controlled by a control means 16 to form convergent cone.

The position of the mobile internal wall element 14 is controlled by a control means 17 to form a divergent cone.

In FIGS. 8, the configuration has been shown of the air intake for a Mach number of about 2:

the two front flaps 3 are in a position in which the front section of the air intake is minimum, on each side, the first wall element 12 is in the retracted position, on each side, the second wall element 13 is in the extended position, on each side, the mobile internal wall element 14 is in an intermediate position.

In FIG. 9 has been shown the configuration of the air intake for a Mach number greater than 5:

the two front flaps 3 are in a position in which the front section of the air intake is maximum, on each side, the first wall element 12 is in an extended position, on each side, the second wall element 13 is in an extended position, on each side, the mobile internal wall element 14 is in an extended position.

In the configuration illustrated in FIG. 8, the air intake forms a convergent-divergent cone defining a minimum section $S_1$, at the level of which is to be found the opening of the first boundary layer trap 5.

In the configuration illustrated in FIG. 9, the air intake forms a convergent-divergent cone, defining a minimum section S, less than the minimum section $S_1$ of the preceding configuration for Mach 2, and at the level of which is to be found the opening of the first boundary layer trap 5.

From the constructional point of view, and in so far as the control means for operating the two front flaps 3 are concerned, it should be mentioned that said control means, designated generally by the reference numbers 18, may be formed by a mechanism comprising an electric motor 18a and a gear 18b integral with the front flap 3, and a rack 18c integral with the aircraft.

However, the other control means 10 (for the mobile rear flap 6), 11 (for the mobile internal wall element 8), 15 (for the first wall element 12), 16 (for the second wall element 13) and 17 (for the mobile internal wall element 14), may advantageously be formed by pneumatic actuators.

Preferably, the assembly of these control means 10, 11, 15, 16, 17 and 18 are of the irreversible type, i.e. that in the absence of an energy source the mobile assemblies which they control must be immobilized in the waiting position during a break in the energy supply.

FIG. 10 shows an air intake in accordance with that of FIG. 7, operating at the matching Mach of 4.35, and FIG. 11 shows an enlarged detail of a particular zone of this air intake.

The initial shocks $C_1$ occurring at the leading edge of the front flap 3 converge on the plane of symmetry P of the air intake. The reflected shocks $C_1R$ are absorbed by the first boundary layer trap 5.

The shocks $C_2$ occurring at the leading edge of the mobile rear flap 6 converge on the plane of symmetry P of the air intake and their reflection $C_2R$ is absorbed by the secondary boundary layer trap 9. These figures also show the position of the straight final shock CF for operation of the air intake under critical conditions.

I claim:

1. Two dimensional air intake, operating at supersonic and hypersonic speed ranges for ensuring the combustion air supply of an aircraft engine, comprising two pivoting front flaps (3) forming respective visors, the front flaps defining an open inlet therebetween having a variable inlet section and being disposed symmetrically on respective sides of a longitudinal plane (P), each front flap (3) being movable about a pivoting axis (4) situated in the vicinity of the air intake wall which extends the front flap considered, characterized by the fact that the pivoting axis (4) of each front flap (3) is situated immediately adjacent a first boundary layer trap (5) disposed in the air intake wall which extends said front flap (3).

2. Air intake according to claim 1, characterized by the fact that each front flap (3) comprises a mobile rear flap(6) movably connected to the front flap (3), so that this mobile rear flap is situated down stream of the first boundary layer trap (5), the rear end (6a) of this mobile rear flap (6) cooperating with the front end (8a) of a mobile internal wall element (8) for defining a second boundary layer trap (9) whose position in the passage of the air intake may vary as a function of the Mach number.

3. Air intake according to claim 1, characterized by the fact that the rear part of the internal wall of the front flap (3) is formed of two articulated wall elements (12, 13), the first (12) on the front flap (3) and the second (13) on the first (12), the rear end (13a) of this second wall element (13) cooperating with the front end (14a) of a mobile internal wall element (14) for defining said first boundary layer trap (5) whose position in the passage of the air intake may vary as a function of the Mach number.

* * * * *